(12) United States Patent
Iwakura (10) Patent No.: US 10,447,132 B2
(45) Date of Patent: Oct. 15, 2019

(54) ELECTROMECHANICAL TRANSDUCER

(71) Applicant: Rion Co., Ltd., Kokubunji-shi, Tokyo (JP)

(72) Inventor: Takashi Iwakura, Kokubunji (JP)

(73) Assignee: RION CO., LTD., Kokubunji-Shi, Tokyo (JP)

( * ) Notice: Subject to any disclaimer, the term of this patent is extended or adjusted under 35 U.S.C. 154(b) by 250 days.

(21) Appl. No.: 15/439,750

(22) Filed: Feb. 22, 2017

(65) Prior Publication Data
US 2017/0244309 A1    Aug. 24, 2017

(30) Foreign Application Priority Data

Feb. 24, 2016    (JP) .................... 2016-033192

(51) Int. Cl.
*H02K 33/00*    (2006.01)
*H02K 33/02*    (2006.01)
(Continued)

(52) U.S. Cl.
CPC ............. *H02K 33/02* (2013.01); *H04R 11/02* (2013.01); *H04R 25/00* (2013.01)

(58) Field of Classification Search
CPC ........ H02K 35/06; H02K 33/00; H02K 35/00; H04R 1/00; H04R 11/00; H04R 11/02;
(Continued)

(56) References Cited

U.S. PATENT DOCUMENTS 7,817,815 B2 * 10/2010 Miller .................... H04R 11/02
                                                          381/191
7,869,610 B2    1/2011 Jayanth et al.
(Continued)

FOREIGN PATENT DOCUMENTS

CN    103428618 A    12/2013
EP    2 897 380 A1    2/2014
(Continued)

OTHER PUBLICATIONS

Extended European Search Report dated Jun. 2, 2017 in European Application No. 17157361.1.

*Primary Examiner* — Julio C. Gonzalez
*Assistant Examiner* — Leda T Pham
(74) *Attorney, Agent, or Firm* — McGinn I.P. Law Group, PLLC.

(57) ABSTRACT

An electromechanical transducer of the invention comprises a structural unit, an armature, and the first and second elastic units. The structural unit includes magnets, a yoke and a coil. The armature includes an inner portion disposed to pass through inside the structural unit and two outer portions protruding from the inner portion in a first direction, and the armature constitutes a magnetic circuit with the structural unit via two regions through which components of the magnetic flux flow in reverse directions in the inner region. The elastic units give restoring forces to the outer portions in response to displacement of the armature due to magnetic forces of the magnetic circuit. In the armature, a cross-sectional area at a predetermined position between the two regions is smaller than that at the two regions, and magnetic flux flowing in the first direction within a range of displacement of the armature.

14 Claims, 8 Drawing Sheets

(51) Int. Cl.
*H04R 11/02* (2006.01)
*H04R 25/00* (2006.01)

(58) Field of Classification Search
CPC .... H04R 11/04; H04R 25/00; H04R 2460/13; H04R 9/025; H04R 9/066
See application file for complete search history.

(56) References Cited

U.S. PATENT DOCUMENTS

| | | | |
|---|---|---|---|
| 8,385,583 B2* | 2/2013 | Thompson | H04R 11/02 310/12.26 |
| 9,601,980 B2* | 3/2017 | Iwakura | H02K 33/00 |
| 2005/0135651 A1* | 6/2005 | Hakansson | H04R 9/025 381/396 |
| 2015/0010199 A1 | 1/2015 | Kim et al. | |
| 2015/0207392 A1 | 7/2015 | Iwakura et al. | |
| 2018/0184210 A1* | 6/2018 | Sato | H04R 11/02 |

FOREIGN PATENT DOCUMENTS

| | | |
|---|---|---|
| JP | 5653543 B1 | 1/2015 |
| WO | WO 2010/025351 A2 | 3/2010 |

* cited by examiner

ELECTROMECHANICAL TRANSDUCER

BACKGROUND OF THE INVENTION

Field of the Invention

The present invention relates to an electromechanical transducer that transduces an electric signal into mechanical vibration, and particularly relates to an electromechanical transducer that comprises a driving unit including an armature, a yoke, a coil, magnets and any other member.

Description of Related Art

An electromechanical transducer or an electroacoustic transducer used in a hearing aid or the like is provided with a driving unit including an armature, a yoke, a coil and magnets, etc., and is configured to drive the armature in response to an electric signal supplied to the coil so that relative vibration between the armature and other members is transduced into mechanical vibration or sound. For example, as examples of a so-called balanced armature type (hereinafter, referred to as "balanced type") electromagnetic transducer, Patent Reference 1 discloses a structural example of a magnetic circuit using a U-shaped armature, and Patent Reference 2 discloses a structural example in which spring members respectively hold between both ends of a plate-like armature and yokes. In any of the above cases, magnetic forces acting on the armature from upper and lower magnets are balanced when no current flows in the coil. On the other hand, when the current flows in the coil, the magnetic forces act on the armature from the upper and lower magnets, and the armature is relatively displaced to a position where the magnetic forces are balanced with restoring force. The restoring force is given by elastic force of the armature itself in the case of the Patent Reference 1 while it is given by elastic force of the spring members in the case of the Patent Reference 2.

Generally, in the above balanced type electromagnetic transducer, if an external force toward the upper or lower magnets is applied to the armature in a state where no current flows in the coil, the armature is attracted to the upper or lower magnet by the action of the magnetic force. However, if the external force is removed, the armature is returned to the balanced position. That is, in order to prevent the armature from being attracted to the magnets, it needs to be designed so that the restoring force toward the balanced position is larger than the magnetic force (attraction) toward the magnets even if the armature is positioned at any position within a range of displacement.

[Patent Reference 1] U.S. Pat. No. 7,869,610
[Patent Reference 2] Japanese Patent No. 5653543

In order to realize an electromechanical transducer of small size and high output power, it is desirable to increase a driving force of the electromechanical transducer as much as possible. For this purpose, it is required to increase a ratio of the magnetic force relative to the amount of displacement of the armature (negative stiffness) in the vicinity of the balanced position so that the ratio gets closer to stiffness of the restoring force (elastic force) of the armature. However, the restoring force is required to be larger than the magnetic force within the range of displacement of the armature, as described above, and given that the magnetic force changes non-linearly relative to the displacement of the armature (see FIG. 8 and description thereof), it is difficult to set the stiffness of the restoring force of the armature to be close to the negative stiffness (absolute value) in the vicinity of the balanced position of the armature. As described above, according to the above-mentioned conventional techniques, it has been difficult to realize an electromechanical transducer having a large driving force relative to an input power while maintaining excellent magnetic characteristics and reliability.

SUMMARY

One of aspects of the invention is an electromechanical transducer transducing an electric signal into mechanical vibration, the electromechanical transducer comprising: a structural unit in which at least one pair of magnets (15 to 18), a yoke (12, 13) conducting magnetic flux generated by the magnets, and a coil (14) supplied with the electric signal are integrally arranged; an armature (19) including an inner portion (19*a*) disposed to pass through an internal space of the structural unit and first and second outer portions (19*b*, 19*c*) protruding on both sides in a first direction (X) from the inner portion, the armature constituting a magnetic circuit with the structural unit via two regions through which components of the magnetic flux flow in directions opposite to each other in the inner portion and being displaced in a displacement direction (Z) based on a magnetic force of the magnetic circuit; a first elastic unit (20, 21) giving a restoring force to the first outer portion in response to displacement of the armature, the first elastic unit being held between the first outer portion and the structural unit; and a second elastic unit (22, 23) giving a restoring force to the second outer portion in response to displacement of the armature, the second elastic unit being held between the second outer portion and the structural unit, wherein the armature has a shape in which a cross-sectional area at a predetermined position between the two regions is smaller than a cross-sectional area at the two regions, and magnetic flux flowing in the first direction in the armature is saturated within a range of displacement of the armature.

According to the electromechanical transducer of the invention, the armature, which is positioned at a balanced position when no current flows in the coil, is displaced relative to the structural unit due to the magnetic force applied to the inner portion when the current flows in the coil, and at this point, each of the first and second elastic units gives the restoring force acting on the armature. Meanwhile, if external force is applied to the armature so as to displace the armature when no current flows in the coil, the magnetic flux in the first direction is generated, and if the amount of the displacement becomes large, the magnetic flux is restricted to a portion at which the cross-sectional area of the armature is small so that the magnetic flux is saturated. Thus, since a difference between the maximum value of negative stiffness acting on the armature and the negative stiffness at the balanced position can be small, it is possible to sufficiently increase a driving force of the electromechanical transducer relative to an input power.

The armature of the invention can be formed in various shapes as long as the above condition of the cross-sectional area is satisfied. For example, a width of the armature in a second direction perpendicular to the first direction and the displacement direction may be smaller at the predetermined position than at the two regions. In this case, the armature is preferably a plate-like member having a constant thickness in the displacement direction. Thereby, the armature having a shape of partially narrow width can be processed relatively easy, and it is possible to reduce influence on shock resistance in comparison with thinning the armature. In addition, as a planer shape of the armature, there can be formed concave portions symmetrically arranged on both sides in the second direction in the inner portion of the armature.

In the invention, the magnetic circuit can be configured using at least one pair of magnets in the two regions of the armature. However, it is preferable to arrange two pairs of magnets facing each other with air gaps therebetween. This structure makes it possible to easily form two components of the magnetic flux that flow in directions opposite to each other in the respective regions on both sides of the armature.

Each of the first and second elastic units may be a pair of elastic members being symmetrically arranged in the displacement direction via the armature. For example, the pair of elastic members may be a pair of spring members being symmetrically arranged in the displacement direction via the armature. By using the pair of spring members, it is possible to easily set a predetermined spring constant in accordance with the restoring force.

According to the present invention, by partially reducing the cross sectional area between the two regions of the armature, it is possible to saturate the magnetic flux flowing in the first direction in the armature within a range of displacement thereof. Therefore, it is possible to realize an electromechanical transducer capable of obtaining a large driving force relative to the input power while maintaining excellent magnetic characteristics and reliability.

DETAILED DESCRIPTION OF THE PREFERRED EMBODIMENTS

Preferred embodiments of the present invention will be described with reference to accompanying drawings. Each of the following embodiments will support an example to which the present invention is applied, and the present invention is not limited to the embodiments. In the following, the present invention will be mainly applied to an embodiment of an electromechanical transducer that transduces an electric signal into mechanical vibration.

Figure 1:
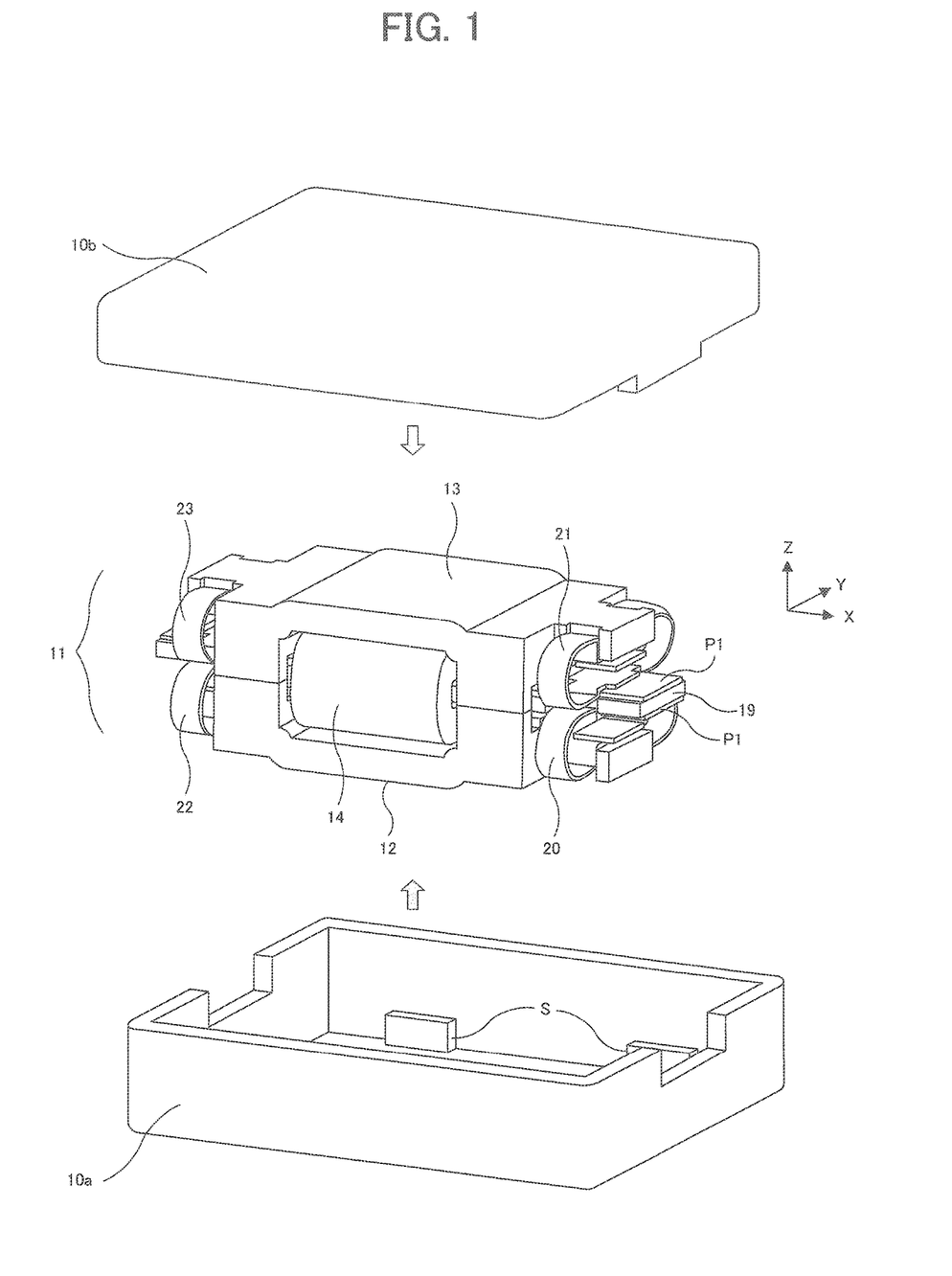
FIG. 1 is a perspective view showing a structure in which a housing that contains an entire electromechanical transducer of an embodiment is detached.
Figure 2:
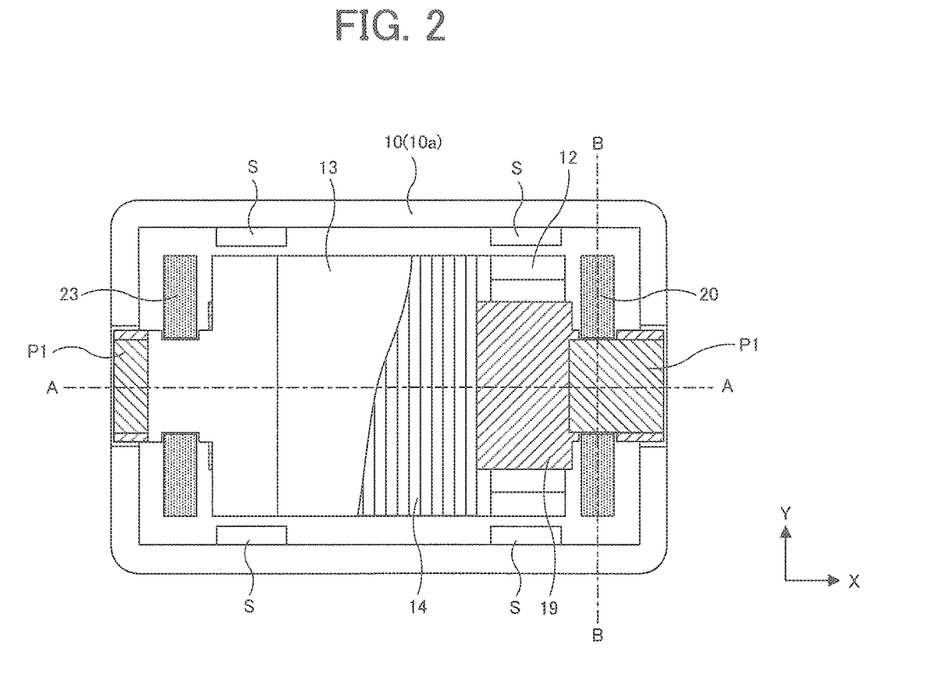
FIG. 2 is a top view showing the electromechanical transducer of the embodiment as viewed from one side in a Z direction (from the top side of FIG. 1)
Figure 3:
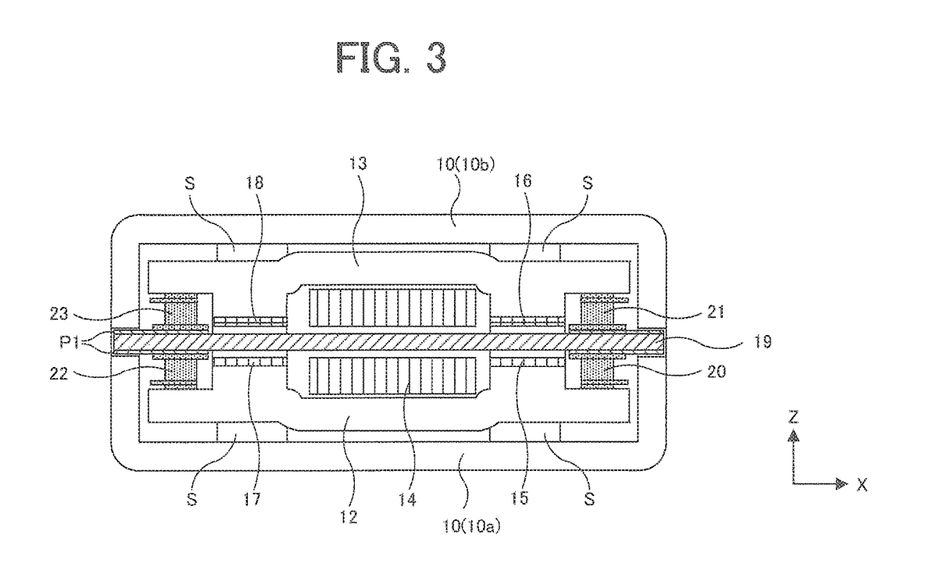
FIG. 3 is a cross-sectional view of the electromechanical transducer of the embodiment along an A-A cross section shown in FIG. 2.
Figure 4:
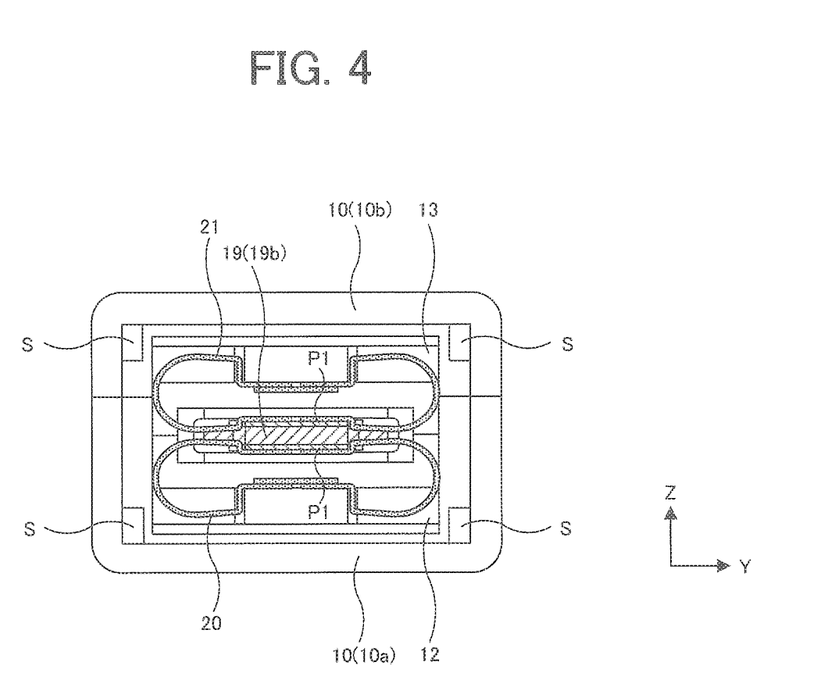
FIG. 4 is a cross-sectional view of the electromechanical transducer of the embodiment along a B-B cross section shown in FIG. 2.
Figure 5:
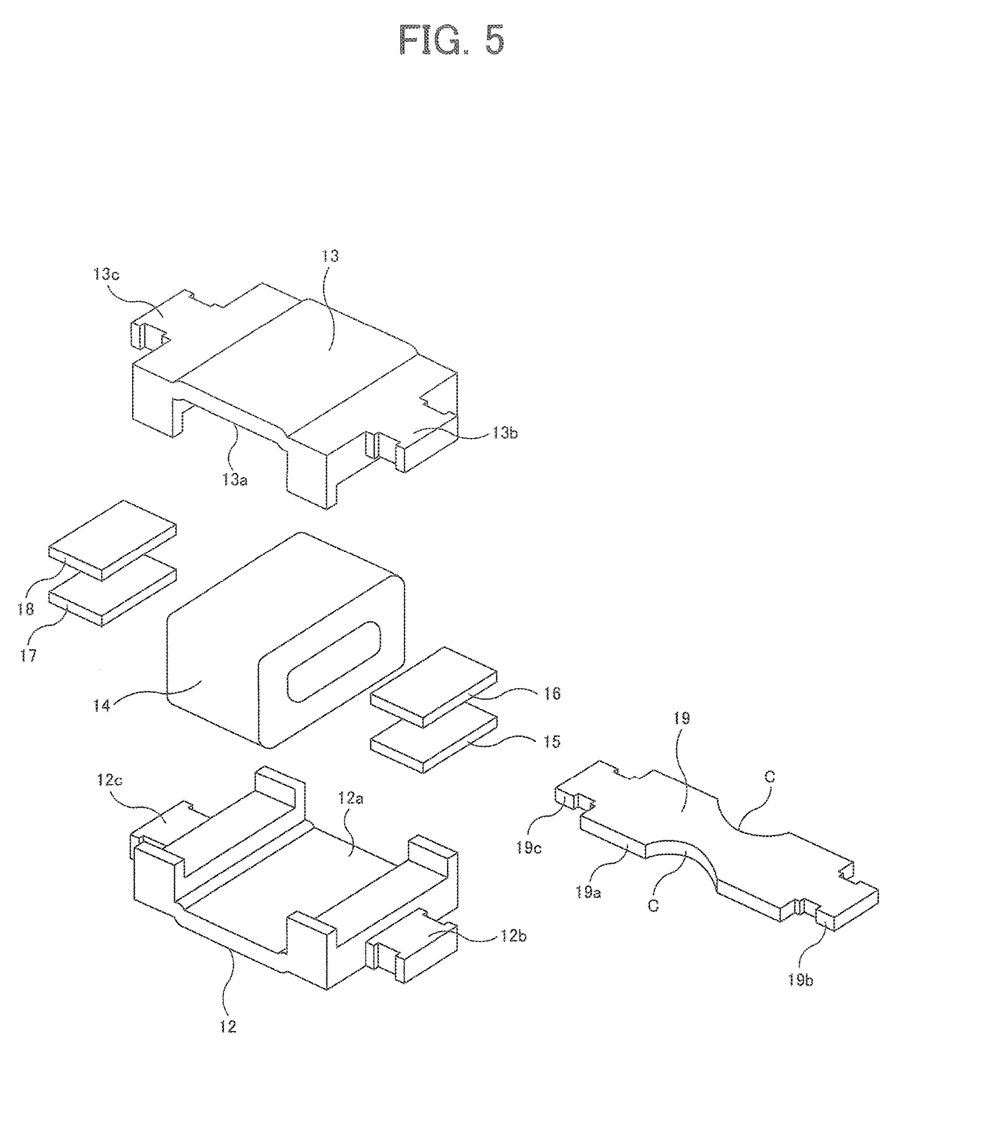
FIG. 5 is an exploded perspective view of a magnetic circuit portion in the electromechanical transducer of the embodiment.

A basic structure of an electromechanical transducer of an embodiment will be described with reference to FIGS. 1 to 5. FIG. 1 is a perspective view showing a structure in which a housing 10 that contains the entire electromechanical transducer of the embodiment is detached. FIGS. 2 to 4 are views of the electromechanical transducer of the embodiment as viewed in directions perpendicular to one another, in which an X direction, a Y direction and a Z direction are indicated by arrows, respectively, for purposes of illustration. FIG. 2 is a top view (partially cutaway end view in which later-mentioned housing member 10b, apart of a yoke 13 and a magnet 16 are cut away) of the electromechanical transducer of the embodiment as viewed from one side in the Z direction (from the top side of FIG. 1), FIG. 3 is a cross-sectional view of the electromechanical transducer of the embodiment along an A-A cross section shown in FIG. 2, and FIG. 4 is a cross-sectional view of the electromechanical transducer of the embodiment along a B-B cross section shown in FIG. 2. Further, FIG. 5 is an exploded perspective view of a later-mentioned magnetic circuit portion in the electromechanical transducer of the embodiment. Although the electromechanical transducer of the embodiment does not have directionality of vertical and horizontal directions, the following descriptions may include expressions using the vertical and horizontal directions in accordance with directions (X, Y and Z) in the plane when viewed in the figures for the purpose of explanations.

As shown in FIG. 1, the housing 10 that houses the entire electromechanical transducer of the embodiment has a structure formed by joining a lower housing member 10a and an upper housing member 10b that are vertically symmetrical to each other. A later-mentioned driving unit 11 of the electromechanical transducer is contained in the housing 10. It is preferable to use light material to form the housing 10 within a strength range capable of supporting the driving unit 11, for example, plastic material or metal material such as stainless steel is used. As shown in FIGS. 1 to 4, four stoppers S for suppressing excessive movement of the driving unit 11 in the Y direction within the range of movement are formed inside each of the lower and upper housing members 10a and 10b. The entire electromechanical transducer is actually covered by the housing 10 having the structure shown in FIG. 1, but FIGS. 2 to 4 show internal structures that are viewed when the housing 10 is partially removed.

The driving unit 11 includes a pair of yokes 12 and 13, a coil 14, four magnets 15, 16, 17 and 18, an armature 19, four armature reinforcing plates P1, and four spring members 20, 21, 22 and 23. In the driving unit 11, the yokes 12 and 13, the coil 14, the four magnets 15 to 18 function as an integrally arranged structural unit of the invention, and the armature 19 penetrating an internal space of this structural unit is disposed so as to be movable to the driving unit 11 via the spring members 20 to 23. Further, a pair of leads for supplying an electric signal is extended from the coil 14 and is electrically connected to a pair of electric terminals provided at one end outside the housing 10, which are omitted in FIGS. 1 to 4.

The lower yoke 12 and the upper yoke 13 are integrally fixed to each other, for example by welding, in a state of facing each other in the Z direction. As shown in FIG. 5, inwardly facing concave portions 12a and 13a are formed in central portions of the respective yokes 12 and 13, and the coil 14 having a through hole is sandwiched between the concave portions 12a and 13a of the upper and lower yokes 12 and 13. In this structure, the coil 14 in which both ends of its through hole are open in the X direction is positioned at the center between the yokes 12 and 13 and is fixed to inner surfaces of the yokes 12 and 13 by adhesive. For example, soft magnetic material such as permalloy (45% Ni) can be used to form the yokes 12 and 13.

There are formed spring member attaching portions 12b, 12c, 13b and 13c protruding on both sides in the X direction of the yokes 12 and 13, respectively. As shown in FIG. 3, the spring members 20 and 22 abut the spring member attaching portions 12b and 12c of the yoke 12 at sides facing the armature 19, respectively, and the spring members 21 and 23 abut the spring member attaching portions 13b and 13c of the yoke 13 at sides facing the armature 19, respectively. Further, cut away portions are formed on both sides in the Y direction of each of the four spring member attaching portions 12b, 12c, 13b and 13c, and a later-mentioned yoke attaching portion 21c (FIG. 6) of each spring members 20 to 23 is partially engages the cut away portions. That is, the four spring member attaching portions 12b, 12c, 13b and 13c and the spring members 20 to 23 are not fixed to each other by welding or adhesive. A specific structure of the spring members 20 to 23 will be described later.

The magnets 15 to 18 are arranged symmetrically on both sides in the X direction on insides of the yokes 12 and 13. That is, a pair of magnets 15 to 16 are adhesively bonded to one opposed end surfaces of the yokes 12 and 13 in the X direction and faces each other with an appropriate distance. Similarly, a pair of magnets 17 to 18 are adhesively bonded to the other opposed end surfaces of the yokes 12 and 13 in the X direction and faces each other with an appropriate distance.

The armature 19 is a long plate-like member extending in the X direction and is disposed so as to pass through a space between the pair of magnets 15 to 16, the through hole of the coil 14, and a space between the pair of magnets 17 to 18. As shown in FIG. 5, the armature 19 includes an inner portion 19a positioned in a space facing the yokes 12 and 13 (the internal space of the structural unit) and outer portions 19b and 19c protruding from both sides of the inner portion 19a. A pair of circular arc-shaped concave portions C are formed at the center in the X direction in the inner portion 19a of the armature 19, and a region in which no concave portion C is formed has the same width in the Y direction as of the magnets 15 to 18. The concave portions C have a function to saturate the magnetic flux flowing in the X direction of the armature 19 by partially reducing the width in the Y direction of the armature 19, which will be described in detail below. Further, the outer portions 19b and 19c of the armature 19 are formed in rectangular portions having a width narrower than the inner portion 19a in the Y direction that are partially cut away. For example, the soft magnetic material such as permalloy (45% Ni) can be used to form the armature 19 in the same manner as the yokes 12 and 13.

Two pairs (4 pieces) of armature reinforcing plates P1 (FIG. 3) are welded to both surfaces of the armature 19 from both outer portions 19b and 19c to both ends of the inner portion 19a. Each of the armature reinforcing plates P1 has a rectangular shape having the same width as the cut away portions of the outer portions 19b and 19c in the Y direction, as shown in FIG. 2, and thus serves to secure thickness of portions of the armature 19 to which the spring members 20 to 23 are attached. In addition, in case where the thickness of the armature 19 can be sufficiently secured in consideration of designs of the magnetic circuit and the spring members 20 to 23, there is no need to provide the armature reinforcing plates P1.

Figure 7:
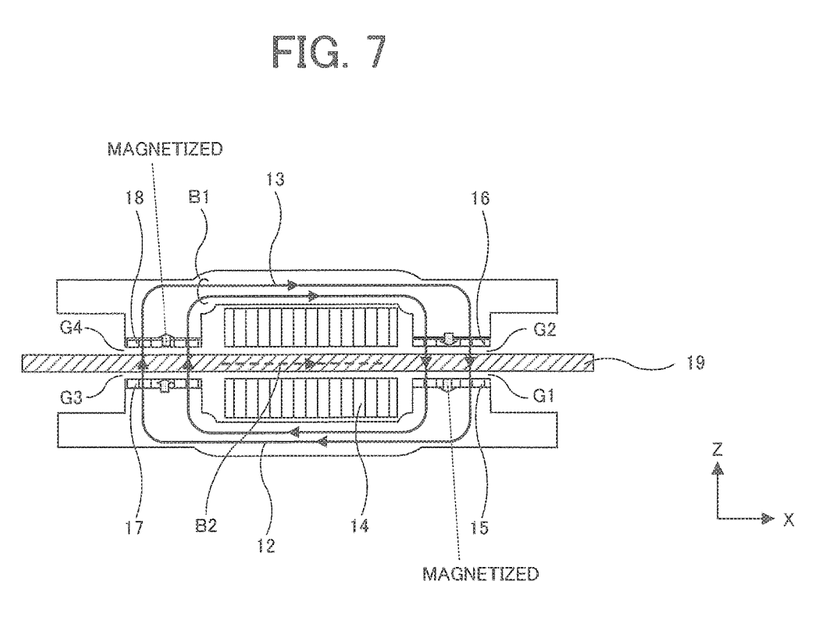
FIG. 7 is a view schematically showing a part constituting the magnetic circuit in the cross-sectional view shown in FIG. 3.

As shown in FIG. 3, there are formed parallel interspaces between the armature 19 and the magnets 15 to 18 above and below the armature 19 (both sides in the Z direction), and the respective interspaces form air gaps G1, G2, G3 and G4 (FIG. 7). Since the four magnets 15 to 18 have the same shape as one another and are symmetrically arranged in the X and Y directions, the four air gaps G1 to G4 also have the same shape as one another. The interspaces (thickness) of the air gaps G1 to G4 are appropriately formed so that the armature 19 does not contact the coil 14 and the magnets 15 to 18 when the armature 19 is displaced in the Z direction within a normal working range.

Further, each of the outer portions 19b and 19c of the armature 19 is sandwiched between the housing members 10a and 10b via the armature reinforcing plates P1 and is fixed by adhesive or the like. Here, the housing 10 is formed so as not to contact the driving unit 11 other than both ends of the armature 19. The above connection portions between the armature 19 and the housing 10 need to have sufficient stiffness such that vibration generated in the driving unit 11 is reliably transmitted to the housing 10. As shown in FIG. 5, each shape of the outer portions 19b and 19c on both sides of the armature 19 overlaps a shape of each opposed portion of the spring member attaching portions 12b, 13b, 12c and 13c of the yokes 12 and 13 in the Z direction.

Each of the four the spring members 20 to 23 is a leaf spring formed by bending a plate-like member, a pair of the spring members 20 and 21 (the first elastic unit of the invention) are attached to one outer portion 19b of the armature 19, and a pair of the spring members 22 and 23 (the second elastic unit of the invention) are attached to the other outer portion 19c of the armature 19. The role of the spring members 20 to 23 is that, when the armature 19 is relatively displaced in the magnetic circuit relative to the structural unit, the spring members 20 to 23 give a restoring force to the armature 19, which is proportional to the amount of displacement of the armature 19. As shown in FIG. 4, the lower spring member 20 (22) and the upper spring member 21 (23) are symmetrically arranged in the Z direction in a state of sandwiching the armature 19 from both sides in the Z direction. Hereinafter, a structure of each of the spring members 20 to 23 will be described with reference to a perspective view shown in FIG. 6.

Figure 6:
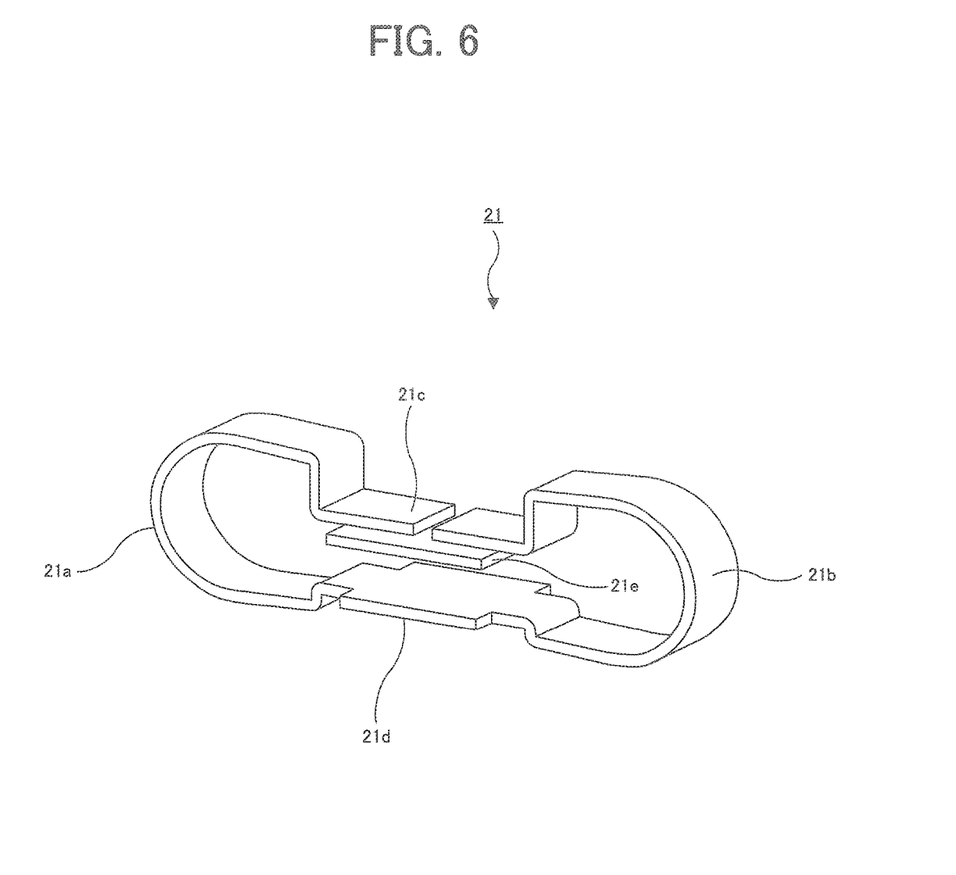
FIG. 6 is a perspective view showing a structure of a spring member.

Although FIG. 6 representatively shows a structure of the spring member 21, other spring members 20, 22 and 23 have the same structure. As shown in FIG. 6, the spring member 21 includes two curved portions 21a and 21b on both sides in the Y direction, a yoke attaching portion 21c and an armature attaching portion 21d that serve as inwardly facing concave portions vertically opposed to each other at the center, and spring member reinforcing plate 21e. In addition, the spring members 20, 22 and 23 (not shown in FIG. 6) are also assumed to include curved portions 20a, 20b, 22a, 22b, 23a and 23b, yoke attaching portions 20c, 22c, 23c, armature attaching portions 20d, 22d and 23d, and spring member reinforcing plates 20e, 22e and 23e. Further, the spring member reinforcing plate 21e is welded to an inner surface of the yoke attaching portion 21c (an inner side of the spring member 21). Both ends of the plate-like member used for forming the spring member 21 are connected via the spring member reinforcing plate 21e at the yoke attaching portion 21c so as to form a continuous ring shape. If no cut section is formed in the spring member 21, there is no need to provide the spring reinforcing plate 21e. Here, the spring member 21 functions as the elastic member of the invention.

The shape of the spring member 21 shown in FIG. 6 is such that, as shown in FIG. 4, the concave shape of the yoke attaching portion 21c engages the shape of the spring member attaching portion 13b of the yoke 13, and the concave shape of the armature attaching portion 21d engages the shapes of the armature 19 and the armature reinforcing plate P1. Although these engaging portions are not fixed by welding or adhesive, when the spring member 21 is mounted in the driving unit 11, it is possible to restrict movements of the spring member 21 in the X and Y directions by the respective concave shapes. The spring member 21 is stably held and contacts the spring member attaching portion 13b of the yoke 13 and the armature reinforcing plate P1, respectively. The spring member 20 is held in a symmetrical arrangement in the Z direction relative to the spring member 21. Further, as shown in FIG. 4, a pair of spring members 20, 21 (22, 23) are slightly compressed in the Z direction so that a pressing force thereof holds the armature 19 at a balanced position.

When designing the spring members 20 to 23 of the embodiment, it is necessary to determine the shape, material and thickness of the leaf spring, curvature of the curved portions 21a and 21b and the like, so as to obtain a spring constant in accordance with the restoring force that should be given to the armature 19. For example, non-magnetic material such as SUS for spring can be used to form the spring members 20 to 23. The thickness of the spring members 20 to 23 can be set to, for example, about 0.1 mm.

Next, a basic operation of the electromechanical transducer of the embodiment will be described. FIG. 7 is a view schematically showing a part constituting the magnetic circuit including the yokes 12 and 13, the coil 14, the magnets 15 to 18 and the armature 19 in the cross-sectional view shown in FIG. 3. For simplicity of description, the armature reinforcing plates P1 fixed to the armature 19 are omitted, and other components not included in the magnetic circuit are also omitted. As shown in FIG. 7, the pair of magnets 15 and 16 and the pair of magnets 17 and 18 that are oppositely arranged in the Z direction via the coil 14 have been magnetized in directions reverse to each other. For example, the magnets 15 and 16 on the right of FIG. 7 are magnetized downward, and the magnets 17 and 18 on the left of FIG. 7 are magnetized upward. A magnetic flux B1 indicated by solid arrows is generated in the yokes 12 and 13 and the armature 19 by the magnets 15 to 18 magnetized in this manner.

Then, magnetic forces due to partial magnetic fluxes of the magnetic flux B1 that pass through the air gaps G1 to G4 act on the armature 19. Specifically, downward forces act on the armature 19 when magnetic forces through the lower air gaps G1 and G3 become relatively strong, and upward forces act on the armature 19 when magnetic forces through the upper air gaps G2 and G4 become relatively strong. When these four forces are not balanced, the armature 19 is displaced to a side of a larger force. Thus, the armature 19 is positioned so that the four forces are balanced in a state where no current flows in the coil 14. At this point, since the armature 19 is not displaced, the magnetic flux passing through the air gap G1 and the magnetic flux passing through the air gap G2 are approximately equal to each other, and the magnetic flux passing through the air gap G3 and the magnetic flux passing through the air gap G4 are approximately equal to each other. Therefore, in the armature 19, there is no net magnetic flux flowing through a portion surrounded by the coil 14.

When flowing the current in the coil 14 in the above state, a magnetic flux having a direction according to the direction of the current is generated in the portion surrounded by the coil 14 in the armature 19. For example, FIG. 7 shows a state where a magnetic flux B2 indicated by a dashed arrow is generated in the armature 19 due to the coil current. At this point, inconsideration of directionality of the magnetic fluxes B1 and B2 in FIG. 7, the generation of the magnetic flux B2 causes magnetic fluxes of the lower air gaps G1 and G3 to increase, respectively, and causes magnetic fluxes of the upper air gaps G2 and G4 to decrease, respectively. As a result, the armature 19 is displaced downward by being applied with the downward magnetic force.

When the armature 19 is displaced downward, restoring forces for returning the displaced armature 19 to its original position are generated by the spring members 20 and 23 (FIG. 3). If a sum of the restoring forces by the spring members 20 and 23 is larger than the magnetic force applied to the armature 19, it is possible to avoid that the armature 19 sticks to the magnets 14 and 16. The above-described operation is the same as an operating principle of a so-called balanced armature type electromagnetic transducer. In addition, when the coil current flows in a direction reverse to the above direction, it may be assumed that the armature 19 is displaced upward by being applied with the upward magnetic force.

Regarding a portion composed of the yokes 12 and 13, the coil 14, and the magnets 15 to 18 (the structural unit of the invention) other than the armature 19, a relative vibration between this structural unit and the armature 19 will be considered hereinafter. As described above, a driving force is generated in response to the current flowing when an electric signal is applied to the coil 14, and this driving force causes the above relative vibration. Since the both ends of the armature 19 are fixed to the housing 10 with sufficient stiffness, the driving force generated between the armature 19 and the structural unit is transmitted to the housing 10 via the armature 19 so as to vibrate the housing 10. In this manner, the electromechanical transducer of the embodiment is configured to generate mechanical vibration corresponding to the electric signal applied from outside.

Figure 8:
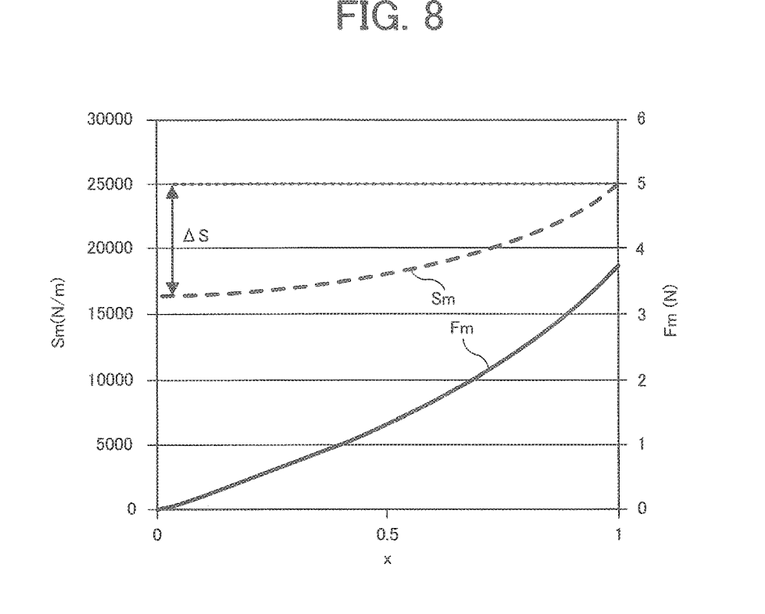
FIG. 8 is a view showing an example of a calculation result of a magnetic force and negative stiffness relative to the amount of displacement of an armature when using the conventional type armature on which concave portions C are not formed, as a comparison example to be compared with the electromechanical transducer of the embodiment.

Next, in the electromechanical transducer of the embodiment, a relation between the force acting on the armature 19 and the displacement thereof will be described using FIGS. 8 and 9. FIG. 8 shows an example of a calculation result of the magnetic force and negative stiffness relative to the amount of displacement of the armature 19 when using the conventional type armature (for example, the armature 19 described in the Patent Reference 2) on which the concave portions C are not formed, which is shown as a comparison example to be compared with the electromechanical transducer of the embodiment. In the calculation result shown in FIG. 8, the same cross-sectional structure as in FIG. 3 and the same magnetic circuit as in FIG. 7 are assumed with the exception of the shape of the armature 19, and also leakage magnetic flux is neglected, magnetic resistances of the armature 19 and the yokes 12 and 13 are neglected, and it is assumed that magnetization of the magnets 15 to 18 does not change when the armature 19 is displaced in the air gaps G1 to G4.

FIG. 8 shows x on the horizontal axis, which is an amount obtained by normalizing the amount of displacement in the Z direction from the balanced position of the armature 19 by a gap length (thickness of the air gaps G1 to G4) on the assumption of the same magnetic circuit as in FIG. 7. That is, x=0 corresponds to a case in which the armature 19 is located at the balanced position (there is no displacement) of magnetic forces of the upper and lower magnets 15 to 18, and x=1 corresponds to a position where the armature 19 makes contact with the magnets 16 and 18 (uppermost position of the range of displacement of the armature 19). Further, the vertical axis of FIG. 8 shows both a magnetic force Fm (on the right scale) applied to the armature 19 by the magnets 16 and 18, and a negative stiffness Sm (on the left scale: indicated by an absolute value) that is an amount obtained by dividing the magnetic force Fm by the amount of displacement of the armature 19. In consideration of symmetry of the armature 19 and the magnetic circuit in the Z direction, the same variation is assumed in the range of x<0 in FIG. 8.

As shown in FIG. 8, the magnetic force Fm increases with the displacement of the armature 19 from the balanced position (x=0). In general, since the magnetic force Fm does not linearly change with the amount of displacement and includes high-level terms thereof, the negative stiffness Sm corresponding to a slope of the magnetic force Fm increases with x in FIG. 8. In this case, in order that the armature 19 being displaced in the air gaps G1 to G4 may not make contact with the upper and lower magnets 15 to 18, the restoring force acting on the armature 19 by the spring members 20 to 23 must be always larger than the magnetic force Fm. In other words, it is necessary to set the spring constant (stiffness) of the spring members 20 to 23 to be larger than the negative stiffness Sm at any position in the range of displacement of the armature 19. Here, assuming that the maximum value of the negative stiffness Sm is represented as $Sm^{max}$, $Sm^{max}$ is approximately 25000 when x=1 in the example shown in FIG. 8, and thus a stiffness Se of the spring members 20 to 23 needs to be larger than this value.

Meanwhile, a sensitivity defined as the amount of displacement relative to an input power in the electromechanical transducer is determined depending on the characteristics of the armature 19 in FIG. 8. That is, when assuming a low frequency range in which the stiffness is dominant, the sensitivity of the electromechanical transducer is determined depending on a difference between the stiffness Se of the spring members 20 to 23 and the negative stiffness Sm (=Se−Sm) in the vicinity of x=0 where the displacement of the armature 19 is small, and thus the smaller the difference (Se−Sm) is, the higher the sensitivity becomes. Regarding the negative stiffness Sm in FIG. 8, when assuming that ΔS is a difference between the above maximum value $Sm^{max}$ and a value Sm(0) at x=0, ΔS can be represented in the following formula (1).

$$\Delta S = Sm^{max} - Sm(0) \quad (1)$$

As described above, since the stiffness Se of the spring members 20 to 23 needs to be larger than the maximum value $Sm^{max}$ of the negative stiffness ($Sm^{max} \leq Se$), the maximum value of the sensitivity of the electromechanical transducer is to be in proportion to a reciprocal of the difference ΔS in the formula (1).

Further, the driving force of the electromechanical transducer is equal to a product of the amount of displacement of the armature 19 and the stiffness Se of the spring members 20 to 23. Thus, in order to increase the driving force as much as possible when the input power to the electromechanical transducer is constant, the stiffness Se of the spring members 20 to 23 needs to be equal to the maximum value $Sm^{max}$ of the negative stiffness within the range of displacement of the armature 19. Eventually, the magnitude of the driving force relative to the input power is in proportion to $Sm^{max}$ and in inverse proportion to ΔS. A coefficient in this case can be rewritten into the following formula (2).

$$Sm^{max}/\Delta S = \{1 - Sm(0)/Sm^{max}\}^{-1} \quad (2)$$

Thus, by approximating $Sm(0)/Sm^{max}$ on the right side of the formula (2) to 1, the magnitude of the driving force relative to the input power can be set to an extremely large value. In the example shown in FIG. 8, since $Sm(0)/Sm^{max}$ is approximately 0.64, $Sm^{max}/\Delta S$ becomes approximately 2.8, and if $Sm(0)/Sm^{max}$ can be greater than 0.9, $Sm^{max}/\Delta S$ becomes greater than 10 so that the driving force can be increased more than three times.

Figure 9:
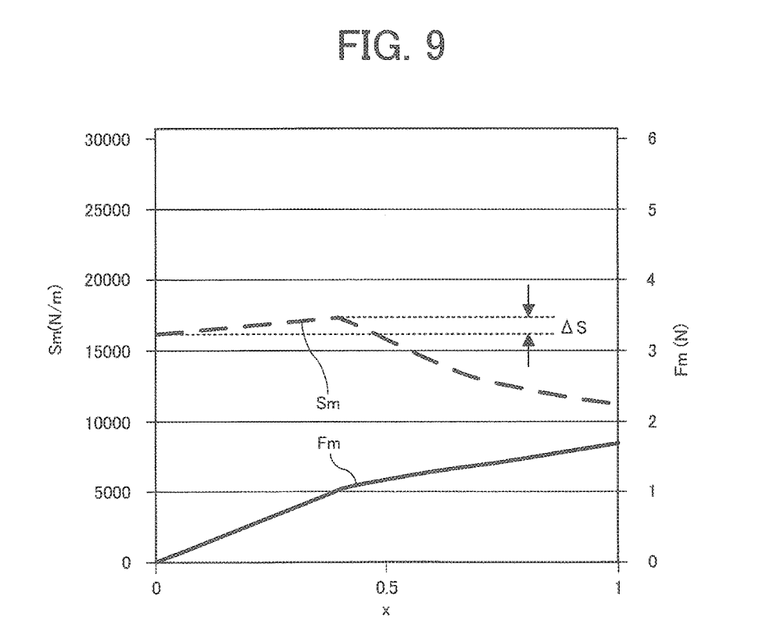
FIG. 9 is a view showing an example of a calculation result under the same conditions as in FIG. 8 in a case using the armature of the electromechanical transducer of the embodiment.
Figure 10:
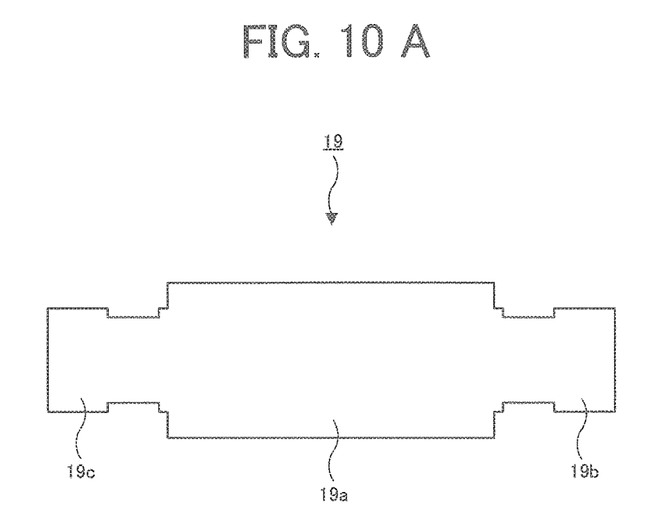
FIGS. 10A and 10B are views showing and comparing shapes of the armature in a planar view corresponding to the calculation results shown in FIGS. 8 and 9.

Next, FIG. 9 shows an example of a calculation result under the same conditions as in FIG. 8 in a case using the armature 19 in the electromechanical transducer of the embodiment. The meanings of the horizontal and vertical axes and respective parameters are the same as those described in FIG. 8. Further, FIGS. 10A and 10B show and compare shapes of the armature 19 in a planar view corresponding to the calculation results shown in FIGS. 8 and 9. FIG. 10A shows a plane view of the armature 19 of the conventional type in an X-Y plane corresponding to FIG. 8, and FIG. 10B shows a plane view of the armature 19 of the embodiment in the X-Y plane corresponding to FIG. 9. There is only one difference between FIGS. 10A and 10B in that the pair of circular arc-shaped concave portions C formed in the inner portion 19a of the armature 19 in FIG. 10B are not formed in the inner portion 19a of the armature 19 in FIG. 10A.

Due to the above difference, the inner portion 19a of the armature 19 in FIG. 10A has a constant width in the Y direction, while the width in the Y direction in FIG. 10B is shortened at the concave portions C so that the inner portion 19a has its narrowest part at the center. Since, the thickness of the armature 19 in the Z direction is common in FIGS. 10A and 10B, a cross-sectional area at the center of the armature 19 in FIG. 10B is smaller than that in FIG. 10A by a ratio of the respective widths at the center. Here, a magnetic flux φ that penetrates the armature 19 in the X direction can be represented as φ=A·B using a magnetic flux density B and a cross-sectional area A, and thus the maximum value of the magnetic flux φ is obtained when magnetic saturation occurs in the armature 19 at a predetermined magnetic flux density, which is in proportion to the cross-sectional area A. A structural feature of the embodiment is to form the concave portions C on the armature 19 so as to reduce the cross-sectional area, thereby magnetically saturating the armature 19 within the range of displacement.

That is, as shown in FIG. 9, the magnetic force Fm and the negative stiffness Sm vary in approximately the same manner as in FIG. 8 in the vicinity of the balanced position of the armature 19, and however, when the amount of displacement of the armature 19 becomes large to some extent, the magnetic flux penetrating the armature 19 in the X direction starts to saturate, and thus the slope of the magnetic force Fm becomes gentle and the negative stiffness Sm decreases. In the embodiment, the above cross-sectional area A of the armature 19 is set so that the magnetic flux in the X direction saturates at an appropriate position within the range of displacement of the armature 19.

Based on the above function, since the armature 19 is magnetically saturated near x=0.4, as shown in FIG. 9, an increment of the magnetic force Fm becomes extremely gentle when the amount of displacement increases, and the negative stiffness Sm decreases. Subsequently, as shown in FIG. 9, a difference ΔS between the maximum value $Sm^{max}$ of the negative stiffness Sm and a value Sm(0) at x=0 deceases, and thus $Sm(0)/Sm^{max}$ in the formula (2) gets closer to 1, as described above. Therefore, the magnitude of the driving force relative to the input power in the electromechanical transducer can be set to an extremely large value. For example, since $Sm(0)/Sm^{max}$ is about 0.9 in the example shown in FIG. 9, $Sm^{max}/\Delta S$ becomes about 10, and therefore the driving force can be increased more than three times in comparison with the example shown in FIG. 8. In addition, the amount of displacement at which the magnetic saturation occurs in FIG. 9 depends on a ratio of widths at a position where there is no concave portion C and at a position where its width is narrowest due to the concave portions C in the inner portion 19a of the armature 19, and therefore it is important to set the width of the concave portion C in accordance with the desired characteristics shown in FIG. 9.

Although this embodiment shows the shape in which the concave portions C are formed in the inner portion 19a of the armature 19 so as to partially narrow the width in the Y direction, it is possible to assume a shape in which the width in the Y direction is narrowed in the entire inner portion 19a. However, according to such a shape, even if the above-mentioned magnetic saturation occurs, an area in which the armature 19 is opposed to the magnets 15 to 18 and the air gaps G1 to G4 is reduced, and therefore the magnetic force applied to the armature 19 cannot be sufficiently obtained. Accordingly, it is desirable to form the concave portions C of the armature 19 in a predetermined position sandwiched between two regions that are opposed to the magnets 15 to 18 and the air gaps G1 to G4. It is also possible to obtain the same effect as the invention by reducing the thickness of the entire armature 19 so as to reduce the cross-sectional area of the inner portion 19a. However, in many cases, it is generally difficult to procure armature material of desired thickness, and thus the invention achieves a larger degree of freedom in designing.

Although the concave portions C are formed in the inner portion 19a of the armature 19 so that the width of the armature 19 in the Y direction is partially narrowed in the embodiment, the present invention is not limited to this structure and the above-mentioned effect can be obtained if the cross-sectional area of the inner portion 19a of the armature 19 can be partially reduced. For example, the thickness of the inner portion 19a of the armature 19 in the Z direction may be partially reduced. However, in this case, it is necessary to take measures against a reduction in impact resistance caused by reduction of the thickness of the armature 19, or the like. Further, processing of the armature 19 can be relatively easy by forming the above concave portions C than by reducing the thickness of the armature 19. In addition, the concave portions C formed on the armature 19 may be formed in various shapes including a rectangular shape and the like without being limited to the arc shape, and also can be formed in a shape asymmetric in the Y direction.

As described above, the electromechanical transducer of the present invention has been described based on the embodiments. However the present invention is not limited to the above embodiments and can be variously modified without departing the essentials of the invention. For example, although the present invention is applied to the electromechanical transducer that transduces an electric signal into mechanical vibration, which has been described in the embodiments, the present invention can be also applied to an electroacoustic transducer that transduces an electric signal into sound. Further, the electromechanical transducer of the present invention can be applied to a hearing aid that is placed in a cavum conchae of a user's ear. By this, both the vibration itself of the electromechanical transducer and the sound generated by the vibration of the housing can function as transmission means, and the sound can be transmitted to the user's ear. In case of applying such an electromechanical transducer to the hearing aid that is placed in the cavum conchae, it is preferable to form the housing 10 so as to have an outer shape suitable for being placed in the cavum conchae.

The invention claimed is:

1. An electromechanical transducer transducing an electric signal into mechanical vibration, the electromechanical transducer comprising:
   a structural unit in which at least one pair of magnets, a yoke conducting magnetic flux generated by the magnets, and a coil supplied with the electric signal are integrally arranged;
   an armature including an inner portion disposed to pass through an internal space of the structural unit, and first and second outer portions protruding on both sides in a first direction from the inner portion, the armature constituting a magnetic circuit with the structural unit via two regions through which components of the magnetic flux flow in directions opposite to each other in the inner portion and being displaced in a displacement direction based on a magnetic force of the magnetic circuit;
   a first elastic unit giving a restoring force to the first outer portion in response to a displacement of the armature, the first elastic unit being held between the first outer portion and the structural unit; and
   a second elastic unit giving a restoring force to the second outer portion in response to the displacement of the armature, the second elastic unit being held between the second outer portion and the structural unit,
   wherein the armature has a shape in which a cross-sectional area at a predetermined position between the two regions is smaller than a cross-sectional area at the two regions, and magnetic flux flowing in the first direction in the armature is saturated within a range of displacement of the armature, and a ratio $Sm(0)/Sm^{max}$ of an absolute value Sm(0) of a negative stiffness based on the magnetic force of the magnetic circuit in a vicinity of a balanced position of the armature to a maximum to absolute value $Sm_{max}$ of the negative stiffness within a range of the displacement of the armature is larger than 0.9.

2. The electromechanical transducer according to claim 1, wherein a width of the armature in a second direction perpendicular to the first direction and the displacement direction is smaller at the predetermined position than at the two regions.

3. The electromechanical transducer according to claim 2, wherein the armature includes a plate-like member having a constant thickness in the displacement direction.

4. The electromechanical transducer according to claim 2, wherein there are provided concave portions symmetrically arranged on both sides in the second direction in the inner portion of the armature.

5. The electromechanical transducer according to claim 1, wherein the at least one pair of magnets includes two pairs of magnets facing each other with air gaps therebetween in the two regions of the armature respectively.

6. The electromechanical transducer according to claim 1, wherein each of the first and second elastic units includes a pair of elastic members being symmetrically arranged in the displacement direction via the armature.

7. The electromechanical transducer according to claim 6, wherein the pair of elastic members include a pair of spring members each having a predetermined spring constant in accordance with the restoring force.

8. The electromechanical transducer according to claim 1, wherein, in a second direction perpendicular to the first direction and the displacement direction, a width of an inner portion of the armature reduces toward a center of the armature.

9. The electromechanical transducer according to claim 1, wherein a pair of circular arc-shaped concave portions extends in the inner portion of the armature.

10. The electromechanical transducer according to claim 9, wherein, in a second direction perpendicular to the first direction and the displacement direction, a width of the inner portion of the armature is constant outside of the concave portions.

11. The electromechanical transducer according to claim 10, wherein, in the second direction, the width of the inner portion of the armature reduces in the concave portions toward a center of the armature.

12. The electromechanical transducer according to claim 10, wherein, in the second direction, the width of the inner portion of the armature continuously reduces in the concave portions toward a center of the armature.

13. The electromechanical transducer according to claim 1, wherein, in a second direction perpendicular to the first direction and the displacement direction, a width of the inner portion of the armature at a center of the armature is less than the width of inner portion of the armature outside of the center of the armature.

14. The electromechanical transducer according to claim 1, wherein the magnetic flux generated by the magnets is changed in accordance with the displacement of the armature.

* * * * *